(12) United States Patent
Hiramatsu et al.

(10) Patent No.: US 6,568,621 B2
(45) Date of Patent: May 27, 2003

(54) SEAT BELT RETRACTOR

(75) Inventors: Koji Hiramatsu, Shiga (JP); Takahiro Yamanishi, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/989,438

(22) Filed: Nov. 21, 2001

(65) Prior Publication Data
US 2002/0070307 A1 Jun. 13, 2002

(30) Foreign Application Priority Data

| Dec. 8, 2000 | (JP) | 2000-374575 |
| Mar. 28, 2001 | (JP) | 2001-092381 |
| Aug. 7, 2001 | (JP) | 2001-239165 |

(51) Int. Cl.⁷ ............................................. B60R 22/28
(52) U.S. Cl. ................................. 242/379.1; 280/806
(58) Field of Search ................. 242/379.1; 280/806; 464/78, 34

(56) References Cited

U.S. PATENT DOCUMENTS

| 6,105,893 A | * | 8/2000 | Schmidt et al. | 242/374 |
| 6,105,894 A | * | 8/2000 | Singer et al. | 242/379.1 |
| 6,106,013 A | * | 8/2000 | Doty et al. | 280/806 |
| 6,206,315 B1 | | 3/2001 | Wier | |
| 6,267,314 B1 | * | 7/2001 | Singer et al. | 242/379.1 |

FOREIGN PATENT DOCUMENTS

JP   2001-260810   9/2001

OTHER PUBLICATIONS

Patent Abstracts of Japan, No. 10–258702 published on Sep. 29, 1998, Applicant: Tokai Rika Co., Ltd.
Patent Abstracts of Japan, No. 2000–016243 published on Jan. 18, 2000, Applicant: Tokai Rika Co., Ltd.
Patent Abstracts of Japan, No. 2000–043677 published on Feb. 15, 2000, Applicant: Takata KK.

* cited by examiner

Primary Examiner—Kathy Matecki
Assistant Examiner—Sang Kim
(74) Attorney, Agent, or Firm—Kanesaka & Takeuchi

(57) ABSTRACT

In a seat belt retractor, a torsion pipe is disposed inside an annular space between a spool and a torsion bar. One end portion of the torsion pipe is connected to pins, and the other portion engages an externally threaded shaft at a locking base to move axially relative to the externally threaded shaft. When the spool rotates relative to the locking base in the webbing withdrawal direction, the torsion bar and the torsion pipe are both twisted and deformed, so that impact energy is absorbed.

9 Claims, 12 Drawing Sheets

Fig. 6(a)
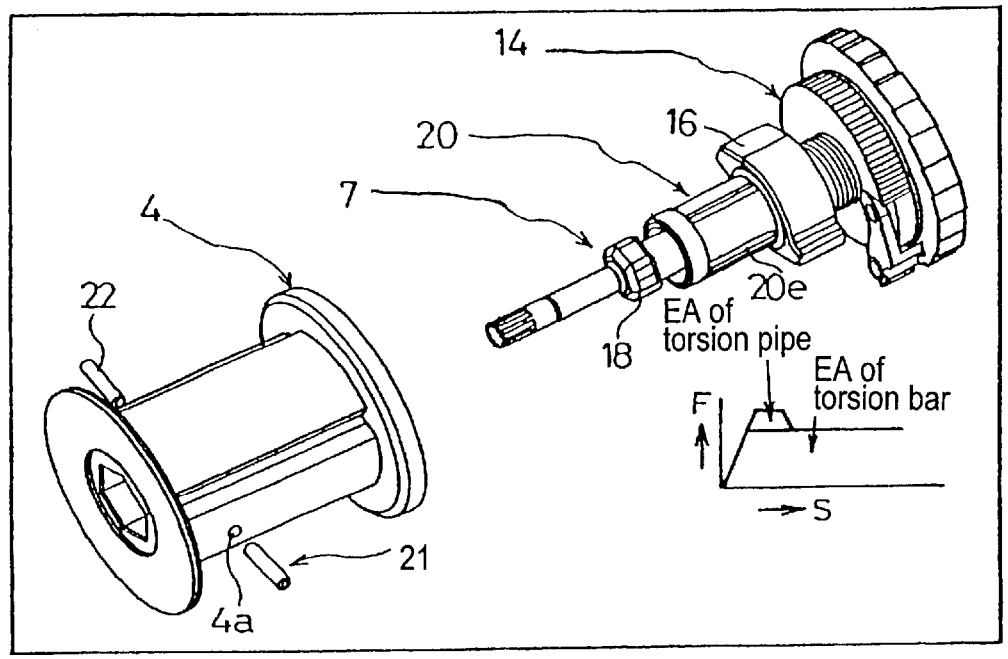
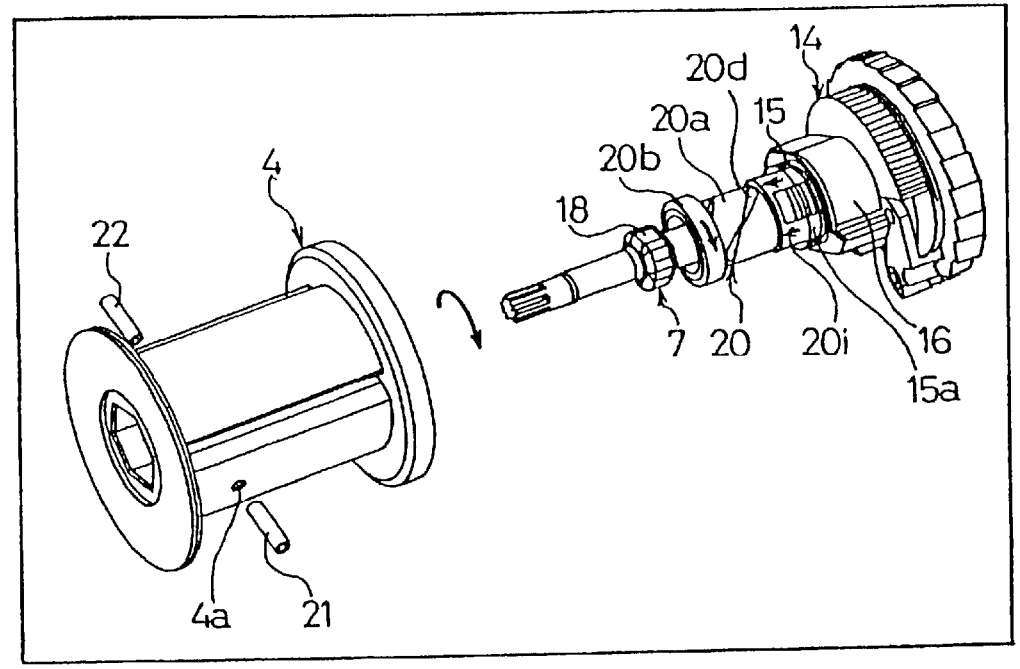
Fig. 6(b)

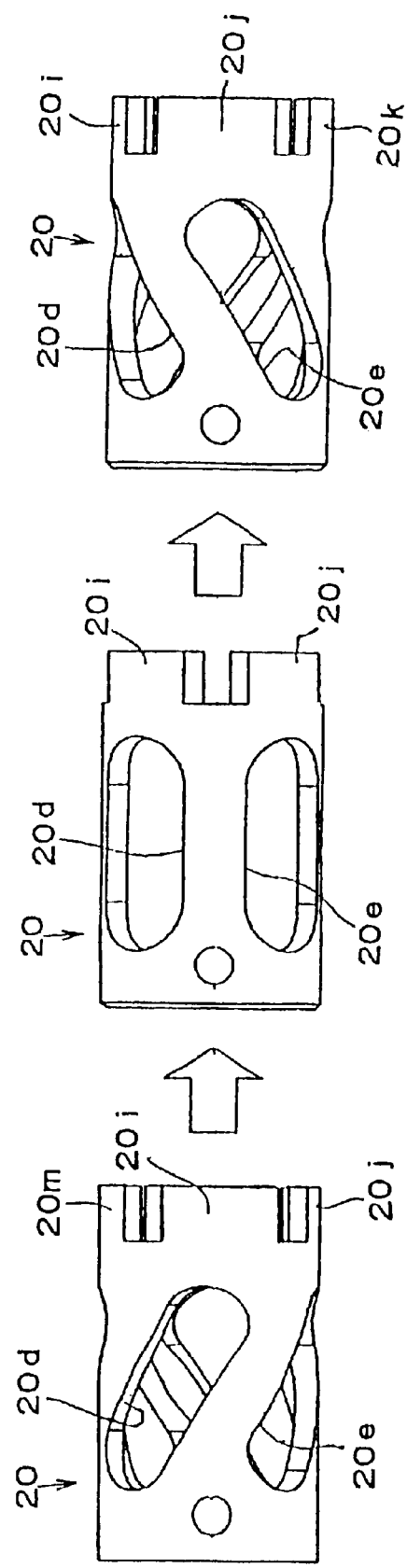

SEAT BELT RETRACTOR

BACKGROUND OF THE INVENTION AND RELATED ART STATEMENT

The present invention relates to a seat belt retractor including an energy mechanism (that is, an absorbing belt load limiting mechanism, which is also hereinafter referred to as the "EA mechanism") which, at a normal time, winds up a webbing so that it can be retracted and extracted, and which, during an emergency, such as collision of a vehicle, prevents the webbing from being extracted or withdrawn, and which, when the drawing out of the webbing is prevented, limits the load exerted on the webbing by twisting and deformation of a torsion bar, so that an impact energy is absorbed. More particularly, the present invention relates to a seat belt retractor in which a limited load (hereinafter referred to as the "EA load") which limits the load exerted on the webbing is set so that it can be varied.

In this type of a conventional seat belt retractor, when a webbing is restrained to protect an occupant of a vehicle in an emergency, such as collision of the vehicle, the vehicle is considerably decelerated, so that the occupant tries to move forward due to a large amount of inertia. Therefore, a large load is exerted on the webbing, so that the occupant receives a large impact force from the webbing. Although this impact force with respect to the occupant does not particularly cause any problems, it is desirable that this impact force be limited if possible.

To achieve this, conventionally, an EA mechanism including a torsion bar has been provided. In an emergency, such as that mentioned above, the torsion bar is twisted and deformed, and absorbs impact energy produced by impact force in order to limit the load exerted on the webbing. In order to effectively absorb the impact energy, various proposals have been made to variably set the EA load.

One example of this type of a conventional seat belt retractor including such an EA mechanism that variably sets the EA load is disclosed in, for example, Japanese Unexamined Patent Publication (KOKAI) Nos. 2000-16243 and 2000-25567. The seat belt retractors disclosed in these documents are each constructed so that a second torsion bar is disposed inside a cylindrical first torsion bar, and the two torsion bars are linked at corresponding end portions to rotate in at least a direction of rotation. In an emergency, when the torsion bars are twisted and deformed, at first, the first and second torsion bars are both twisted and absorb a large amount of impact energy. When the first torsion bar ruptures, the impact energy is absorbed by twisting the second torsion bar alone. Accordingly, the EA load is varied in two stages.

Another example of this type of a conventional seat belt retractor including such an EA mechanism that variably sets the EA load is disclosed in, for example, Japanese Unexamined Patent Publication (KOKAI) No. 10-258702. In the seat belt retractor disclosed in this document, a shaft is disposed at the inner portion of a cylindrical spool that winds up a webbing, and an EA plate which is disposed inside a space formed between the spool and the shaft, and has a double-curvature shape and a control structural portion, is provided. One end of the EA plate receives a rotational force of the spool in a direction in which the webbing is extracted. The other end of the EA plate is connected and secured to the shaft. During the relative rotation of the spool with respect to the shaft in the direction in which the webbing is extracted in an emergency, a rotational force of the spool in the direction in which the webbing is extracted acts on the one end of the EA plate, so that the EA plate undergoes plastic deformation. This causes impact energy to be absorbed, and deformation force to be changed by the control structural portion, that is, energy absorption to be changed. In this way, the EA load is made variable.

Still another example of this type of the conventional seat belt retractor including such an EA mechanism that variably sets the EA load is disclosed in, for example, Japanese Unexamined Patent Publication No. 2000-43677. The seat belt retractor disclosed in this document comprises a torsion bar, which is provided in a spool, and a stopper ring, which is provided at a side surface of the spool. During the relative rotation of the spool with respect to a pawl holder in a direction in which the webbing is extracted at the time of an emergency, at first, the torsion bar is twisted and an engaging stepped portion of the pawl holder cuts an inner peripheral side of the stopper ring in order to absorb a large amount of impact energy. When the cutting of the inner peripheral side of the stopper ring is completed, the impact energy is absorbed by twisting the torsion bar alone. In this way, the EA load is made variable in two stages.

The EA load may be made variable by using the following structure instead of the structure that makes it variable by cutting the inner peripheral side of the stopper ring. This structure comprises a shear pin or a shear protrusion at a side surface of the spool. In this structure, at first, the torsion bar is twisted and a shear load is exerted onto the shear pin or the shear protrusion in order to absorb a large amount of impact energy. After the shear pin or the shear protrusion has been ruptured by shearing, impact energy is absorbed by twisting the torsion bar alone. This causes the EA load to be made variable.

However, in the above-described EA mechanism using two torsion bars, since the axial length of the first torsion bar to be ruptured is set equal to the main axial length of the second torsion bar, the EA load depends upon the axial length of the second torsion bar. Therefore, the EA load can not be set freely, and it is difficult to arbitrarily set the EA load regardless of the axial length of the second torsion bar.

In the above-described EA mechanism using the EA plate having the control structural portion, not only does the EA plate have a complicated double-curvature form, but also the EA mechanism has a complicated structure. Moreover, since the form of the EA plate and the structure of the EA mechanism are complicated, and the control structural portion is formed by local work hardening, it is difficult to stably set the EA load.

In the EA mechanism in which the inner peripheral side of the stopper ring is cut, it is difficult to always stably set the EA load by cutting the inner peripheral side of the stopper ring.

In view of the above-described situations, it is an object of the present invention to provide a seat belt retractor which, by a relatively simple structure, makes it possible to set an EA load more freely and to more stably set the EA load.

Further objects and advantages of the invention will be apparent from the following description of the invention.

SUMMARY OF THE INVENTION

To overcome the above-described problems, in a first aspect of the invention, a seat belt retractor comprises at least: a spool which winds up a seat belt; a lock mechanism including a locking member whose rotation in a direction in which the seat belt is extracted or withdrawn is prevented in an emergency; and a seat belt load limit mechanism including a torsion bar disposed in the spool. The torsion bar rotatably connects the spool and the locking member and is twistable and deformable. When the rotation of the locking member in the direction in which the seat belt is extracted is prevented in order for the spool to rotate relative to the locking member in the direction in which the seat belt is extracted, the load limit mechanism limits a load that is exerted on the seat belt by the twisting and deformation of the torsion bar. The seat belt load limit mechanism further includes a torsion pipe disposed inside an annular space between the spool and the torsion bar. One end side of the torsion pipe is connected and secured to the spool and the other end side of the torsion pipe is provided so as to be engageable with and disengageable from the locking member, or the one end side of the torsion pipe is provided so as to be engageable with and disengageable from the spool and the other end side of the torsion pipe is connected and secured to the locking member. When, at a normal time, the engageable and disengageable end side of the torsion pipe engages a member for engagement with the engageable and disengageable end side in a direction of rotation and when the spool rotates relative to the locking member in the direction in which the seat belt is extracted, the load exerted on the seat belt is limited by the twisting and deformation of the torsion pipe, and the engageable and disengageable end side of the torsion pipe moves out of and is disengaged from the member which engages the engageable and disengageable end side by contraction of the torsion pipe in an axial direction caused by the twisting and the deformation of the torsion pipe.

According to a second aspect of the invention, the engageable and disengageable end side of the torsion pipe includes an axially extending engaging protrusion, and the locking member or the spool includes an engaging recess which engageably and disengageably receives the engaging protrusion. When, at a normal time, the engaging protrusion is inserted into the engaging recess and engages the engaging recess in the direction of rotation and the spool rotates by a predetermined amount relative to the locking member in the direction in which the seat belt is extracted, the engaging protrusion moves out of the engaging recess.

According to a third aspect of the invention, the torsion pipe includes a torsion performance control portion that controls the torsion performance of the torsion pipe.

According to a fourth aspect of the invention, the torsion performance control portion of the torsion pipe includes a hole that passes completely through the torsion pipe from an outer peripheral surface to an inner peripheral surface of the torsion pipe, or a recess that does not pass completely through the torsion pipe from the outer peripheral surface to the inner peripheral surface of the torsion pipe.

According to a fifth aspect of the invention, a side edge of the engaging protrusion formed downstream in a direction in which a webbing is extracted and a side edge of the engaging recess formed downstream in the direction in which the webbing is extracted are inclined.

According to a sixth aspect of the invention, the seat belt retractor further comprises torsion pipe position control means which, when the engageable and disengageable end side of the torsion pipe is disengaged from the member which engages the engageable and disengageable end side, moves the torsion pipe in a direction in which the engageable and disengageable end side of the torsion pipe moves away from the member which engages the engageable and disengageable end side.

According to a seventh aspect of the invention, the torsion pipe is provided between the spool and the locking member with the torsion pipe being previously twisted by a predetermined amount in a direction opposite to a direction of the twisting and deformation of the torsion pipe.

In the seat belt retractor of the present invention having such a structure, when the rotation of the locking member is stopped due a large deceleration of a vehicle that is produced in, for example, a collision of the vehicle, and when, by a webbing drawing-out load, the spool rotates relative to the locking member in the direction in which the webbing is extracted, the torsion bar and the torsion pipe are twisted and deformed. This causes impact energy to be absorbed by the torsion bar and the torsion pipe. The torsion pipe is contracted in the axial direction as a result of being twisted and deformed, so that the engageable and disengageable end side of the torsion pipe moves axially in the direction in which it disengages from a member (such as the locking member or the spool) that engages this end of the torsion pipe. When the spool rotates relative to the locking member by a predetermined amount, the engageable and disengageable end side of the torsion pipe disengages the member that engages this end side of the torsion pipe. This causes completion of the twisting and deformation of he torsion pipe, after which the torsion bar alone is continually twisted and deformed, so that impact energy is absorbed by twisting and deforming the torsion bar alone. Accordingly, the limit load of the seat belt load limit mechanism varies in two stages from a limit load based on the twisting and deformation of both torsion bar and torsion pipe and a limit load based on the twisting and deformation of the torsion bar alone.

In the torsion pipe used in the present invention, not only the thickness, the material, and the pipe diameter can be arbitrarily selected, but its axial length can also be set regardless of the axial length of the torsion bar. Therefore, the limit load can be set freely. In addition, since the torsion pipe can be formed using a simple pipe structure, the structure of the seat belt load limit mechanism can be simplified, and the limit load is more stably set.

In particular, in the seat belt retractor according to the second aspect of the invention, the mechanism that engages and disengages the torsion pipe and the locking member or the spool, comprises an engaging protrusion formed on the torsion pipe and an engaging recess formed in the locking member or the spool, so that the structure of the seat belt load limit mechanism is further simplified.

In the seat belt retractor according to the third aspect of the invention, a torsion performance control portion is provided at the torsion pipe. By the torsion performance control portion, the torsion pipe can have any torsion performance. Therefore, the EA load can be set more freely.

In the seat belt retractor according to the fourth aspect of the invention, the torsion performance control portion is formed by a hole that passes completely through the torsion pipe from the outer peripheral surface to the inner peripheral surface of the torsion pipe or by a recess that does not pass completely through the torsion pipe from the outer peripheral surface to the inner peripheral surface of the torsion pipe. By arbitrarily setting the width of the hole or the recess, the axial length of the hole or the recess, the tilt angle of the hole or the recess with respect to the axial direction of the torsion pipe, and the number of holes or recesses, any torsion performance of the torsion pipe can be easily provided, the torsional performance control portion can be easily formed by a hole or a recess, and the structure of the torsion performance control portion is simplified. Moreover, since the hole or recess is easily formed, the EA load can be more stably set.

In the seat belt retractor according to the fifth aspect of the invention, since the side edge of the engaging protrusion at the downstream side in the direction in which the webbing is extracted and the side edge of the engaging recess at the downstream side in the direction in which the webbing is drawing are inclined, when the torsion pipe is twisted and moves in the direction in which the engaging protrusion moves out of the engaging recess, the engaging protrusion gradually moves axially in the direction in which it moves out of the engaging recess while it gradually rotates in the direction in which the webbing is extracted by the inclined surfaces. This makes it possible for the limit load to vary smoothly when changing from a limit load based on the torsion bar and the torsion pipe to a limit load based on the torsion bar alone.

In the seat belt retractor according to the sixth aspect of the invention, when a vehicle is considerably decelerated in, for example, a collision of the vehicle, the torsion pipe position control means causes the torsion pipe to move so that the engageable and disengageable end side of the torsion pipe moves away from the member that engages this end side of the torsion pipe. Therefore, the engageable and disengageable end of the torsion pipe will not re-engage the member that has engaged this end, so that a stable EA load can be obtained.

In the seat belt retractor according to the seventh aspect of the invention, since a spool stroke when the EA load is applied by the torsion bar and the torsion pipe is increased, impact energy can be more effectively absorbed.

BRIEF DESCRIPTION OF THE DRAWINGS

FIGS. 6(a) and 6(b) illustrate the operation of the torsion pipe used in the embodiment, wherein FIG. 6(a) shows a state in which the torsion pipe is in a non-operating state, and FIG. 6(b) shows a state in which the torsion pipe is in an operating state;

FIGS. 11(a) and 11(b) illustrate still another embodiment of the present invention, wherein FIG. 11(a) is a perspective view, and FIG. 11(b) is a sectional view taken along line 11(b)–11(b) of FIG. 11(a);

FIGS. 13(a) and 13(b) illustrate still another embodiment of the present invention, wherein FIG. 13(a) is a perspective view, and FIG. 13(b) is a sectional view taken along line 13(b)–13(b) of FIG. 13(a);

FIGS. 14(a) and 14(b) partly illustrate still another embodiment of the present invention, wherein FIG. 14(a) is an exploded perspective view, and FIG. 14(b) is a partial sectional view by cutting a plane as in FIG. 1;

FIGS. 16(a) through 16(e) illustrate another embodiment of the present invention, wherein FIG. 16(a) shows a torsion pipe in a non-operating state (assembled state), FIG. 16(b) shows the torsion pipe in the operation, FIG. 16(c) shows the torsion pipe after completion of the operation thereof, and FIGS. 16(d) and 16(e) are graphs showing an amount of rotation of a spool.

DETAILED DESCRIPTION OF PREFERRED EMBODIMENTS

Hereunder, preferred embodiments of the present invention will be explained with reference to the drawings.

Figure 1:
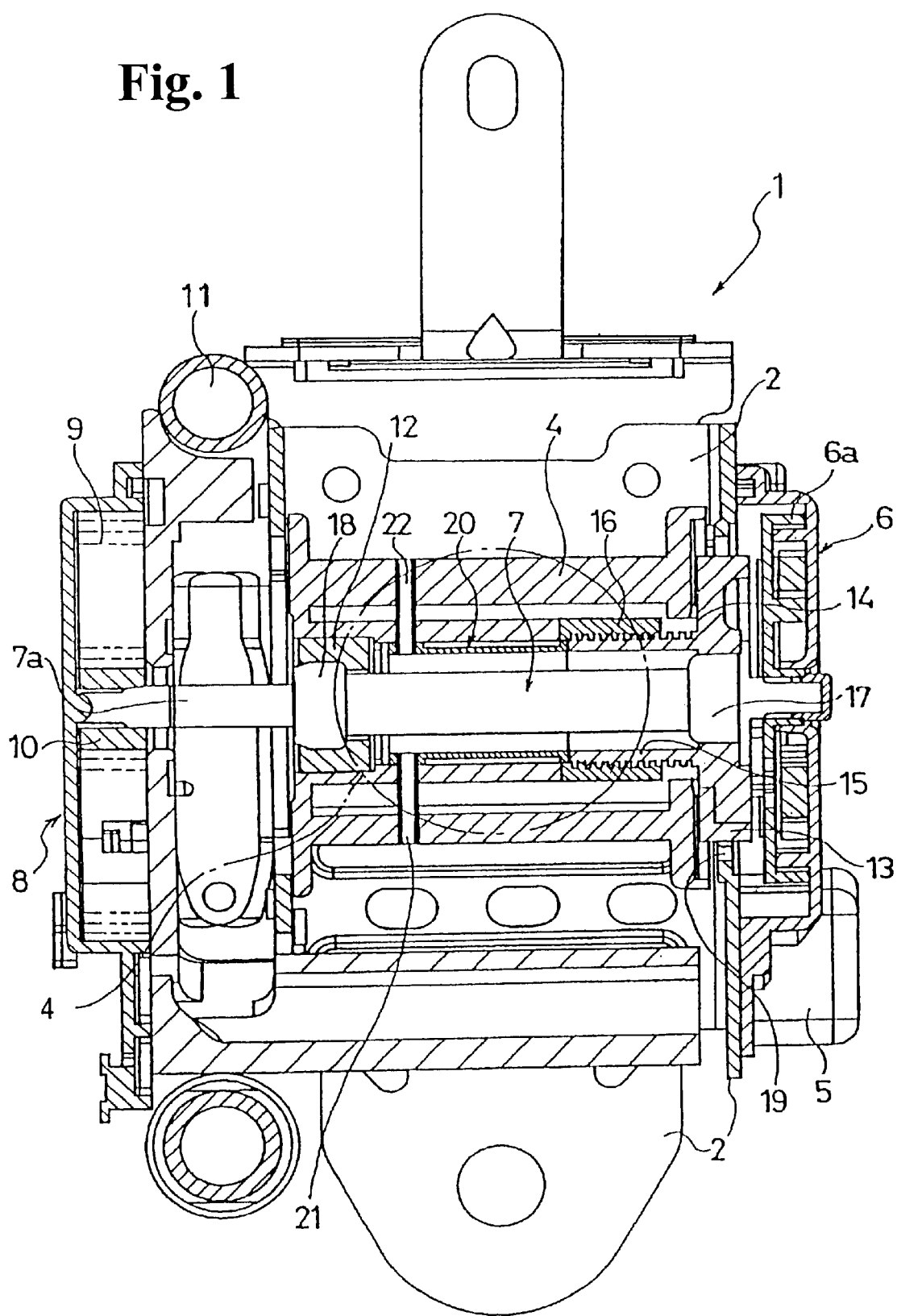
FIG. 1 is a sectional view of an embodiment of a seat belt retractor in accordance with the present invention with an EA mechanism in a non-operating state.
Figure 2:
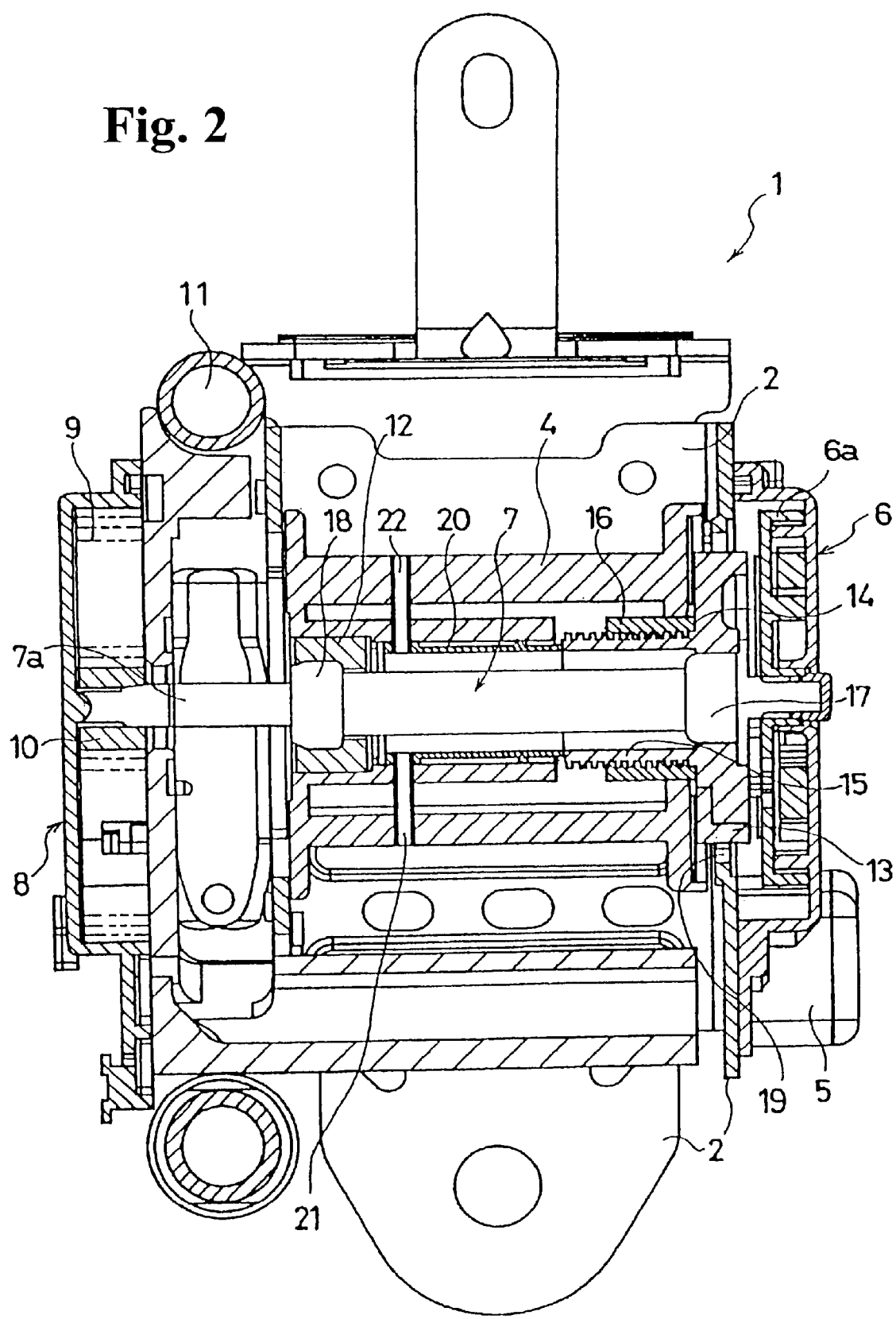
FIG. 2 is a sectional view showing the embodiment of the seat belt retractor shown in FIG. 1 with the EA mechanism in an operating state.

FIG. 1 is a vertical sectional view showing an embodiment of a seat belt retractor of the present invention, with an EA mechanism in a non-operating state. FIG. 2 is a vertical sectional view of the seat belt retractor shown in FIG. 1, with the EA mechanism in an operating state. Reference numeral 1 denotes a seat belt retractor; reference numeral 2 denotes a U-shaped frame; reference numeral 3 denotes a webbing; reference numeral 4 denotes a spool, disposed between both side walls of the U-shaped frame 2, which winds up the webbing 3; reference numeral 5 denotes deceleration detecting means which detects a large vehicle deceleration that occurs in an emergency; reference numeral 6 denotes lock means which operates due to the deceleration detecting means 5 in order to prevent at least rotation of the spool 4 in the direction in which the webbing is extracted; reference numeral 7 denotes a torsion bar which is axially movably fitted to and passes through the center of the spool 4 and which is rotationally connected to the spool 4 and the lock means 6; reference numeral 8 denotes spring means which always biases a bush shaft 12, an extension axis 7a of the torsion bar 7, a second torque transmitting portion 18 (described later), and the spool 4 through the bush shaft 12, by a spring force of a spiral spring 9 in the direction in which the webbing is retracted; reference numeral 11 denotes a pre-tensioner which operates in the aforementioned emergency to produce a webbing winding torque, that is applied to the spool 4 through the extension axis 7a of the torsion bar 7, the second torque transmitting portion 18 and the bush shaft 12; and reference numeral 20 denotes a torsion pipe, disposed in an annular space between the torsion bar 7 and the spool 4, which is a characteristic portion of the present invention.

The lock means 6 comprises a locking base 14 which is supported by the spool 4 so as to rotate integrally therewith at a normal time, and so as to stop in an emergency in order to rotate relative to the spool 4, and which rockably holds the pawl 13. The locking base 14 has an externally threaded shaft 15. A nut-shaped stopper member 16, which rotates integrally with the spool 4, is screwed to the externally threaded shaft 15. At the torsion bar 7, there are formed a first torque transmitting portion 17, which engages the locking base 14 so that it is not capable of rotating relative to the locking base 14, and the second torque transmitting portion 18, which engages the spool 4 so that it is not capable of rotating relative to the spool 4.

Figure 3:
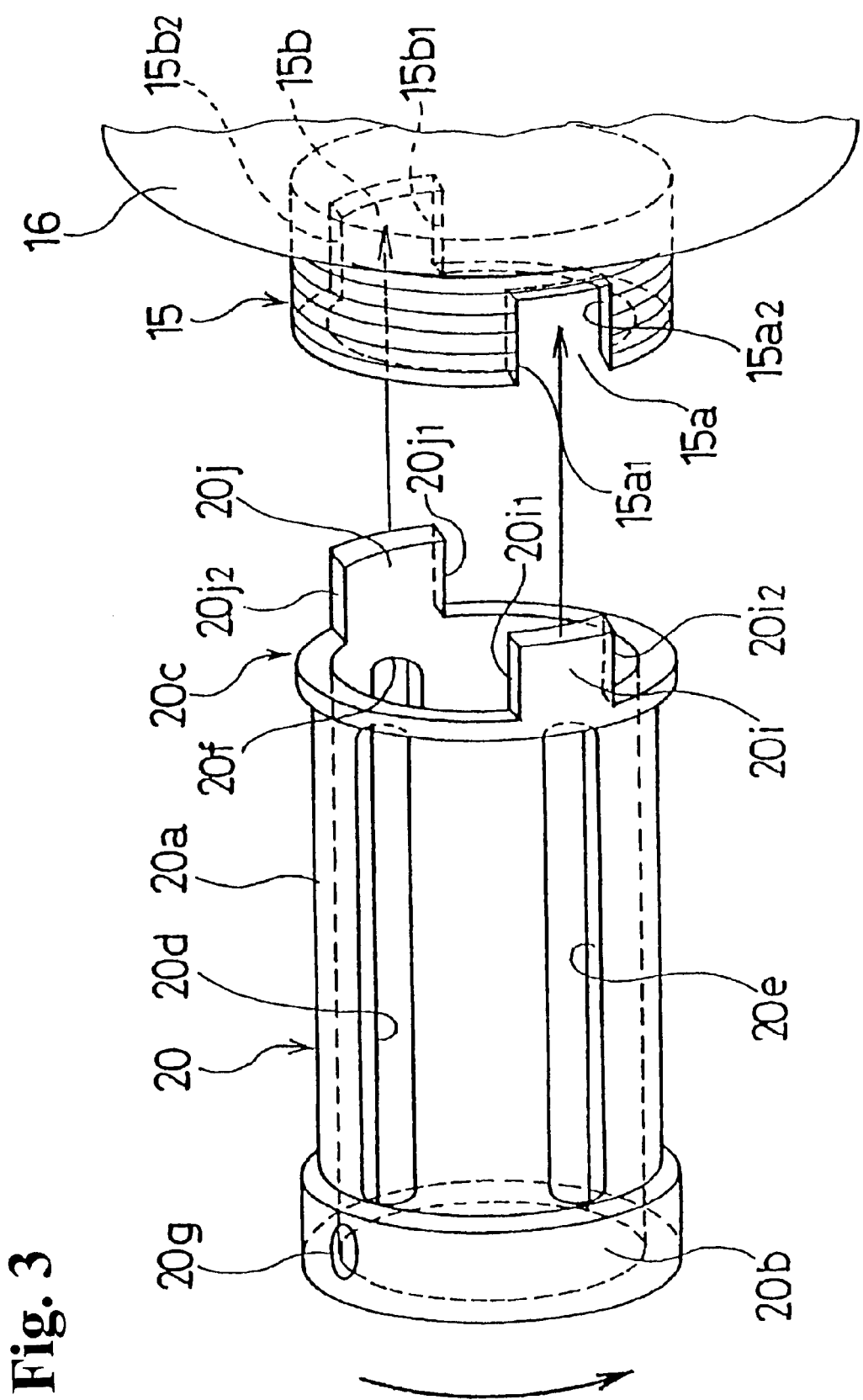
FIG. 3 is a perspective view of a portion of a locking base and a torsion pipe used in the embodiment.

As shown in FIG. 3, the torsion pipe 20 comprises a cylindrical torsion portion 20a, an annular torque acting portion 20b, and an engaging portion 20c. The torsion portion 20a is provided at the central portion thereof and undergoes plastic twisting deformation when the spool 4 and the locking base 14 move relative to each other. The torque acting portion 20b is provided at the left end of the torsion portion 20a in FIG. 3, and a torque from the spool 4 acts on the torque acting portion 20b. The engaging portion 20c engages the externally threaded shaft 15 of the locking base.

Figure 4:
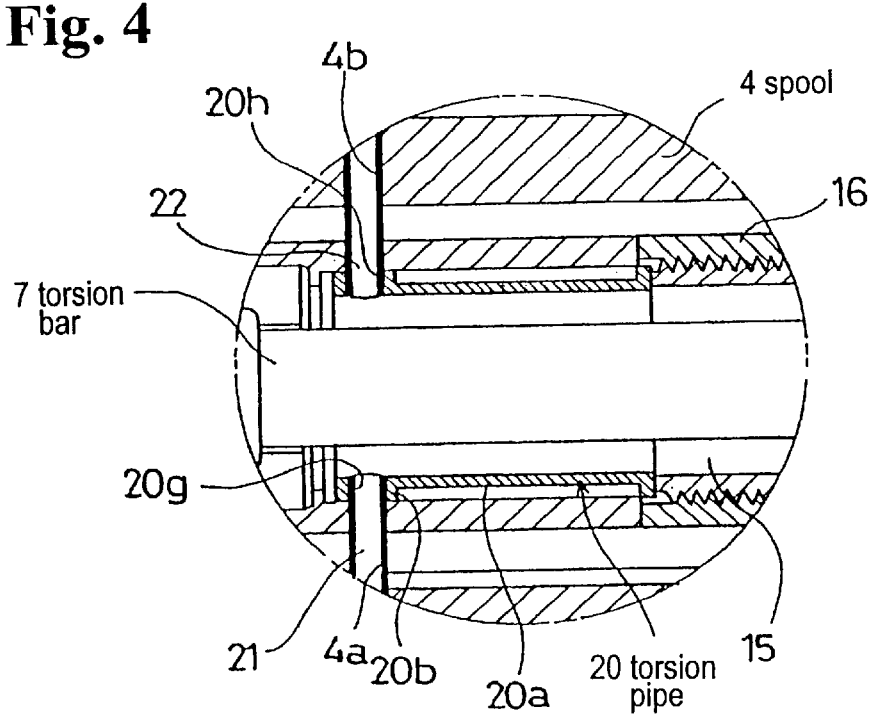
FIG. 4 is an enlarged sectional view of a portion 4 shown in FIG. 1, partly showing a state in which the torsion pipe used in the embodiment is mounted to a spool.

Four slit holes, i.e. slit holes 20d, 20e, 20f and other slit hole (not shown), which extend only in the axial direction (that is, in a direction parallel to the axial direction of the axial direction of the torsion pipe 20) are formed in the torsion portion 20a. As shown in FIG. 4, a pair of radial pin insertion holes 20g and 20h for inserting a pair of securing pins 21 and 22 for securing with the spool 4 is formed in the torque acting portion 20b. Any number of the securing pins 21 and 22 and the pin insertion holes 20g and 20h may be used. The slit holes 20d, 20e and 20f form a torsional performance control portion used in the present invention for variously setting the torsional performance of the torsion pipe 20.

As shown in FIG. 3, the engaging portion 20c comprises a pair of engaging protrusions 20i and 20j. Both side edges $20i_1$ and $20i_2$ of the engaging protrusion 20i and both side edges $20j_1$ and $20j_2$ of the engaging protrusion 20j are parallel to the axial direction of the torsion pipe 20. Although, in FIG. 3, the engaging protrusions 20i and 20j are provided at equal intervals in the peripheral direction, but they may be provided at unequal intervals in the peripheral direction. Although two engaging protrusions are used, a predetermined number equal to or greater than one engaging protrusion may be used. When a plurality of engaging protrusions is provided, they may be provided at equal or unequal intervals in the peripheral direction, but it is desirable that the plurality of engaging protrusions be provided at equal intervals in the peripheral direction from the viewpoint of the balance of the action of forces.

As shown in FIG. 3, a pair of engaging recesses 15a and 15b to which the pair of engaging protrusions 20i and 20j of the torsion pipe 20 is fitted is provided in the externally threaded shaft 15 at the locking base 14. Both side edges $15a_1$ and $15a_2$ of the engaging recess 15a and both side edges $15b_1$ and $15b_2$ of the engaging recess 15b are parallel to the axial direction of the externally threaded shaft 15. Although two engaging recesses 15a and 15b are used, the number of the engaging recesses may correspond to the number of engaging protrusions of the torsion pipe 20.

As shown in an enlarged form in FIG. 4, the engaging protrusions 20i and 20j of the torsion pipe 20 are disposed inside an annular space between the torsion bar 7 and the spool 4 so as to oppose the externally threaded shaft 15 at the locking base 14. By inserting the securing pins 21 and 22 into corresponding pin insertion holes 4a and 4b of the spool 4 and the corresponding pin insertion holes 20g and 20h of the torque acting portion 20b, the torsion pipe 20 is secured inside the spool 4 in the axial and rotational directions.

While the stopper member 16 is screwed to the externally threaded shaft 15 at the locking base 14, the externally threaded shaft 15 and the stopper member 16 are inserted into axial holes of the spool 4, and the engaging protrusions 20i and 20j are inserted into the corresponding engaging recesses 15a and 15b, so that the locking base 14 is mounted to the spool 4 so as to be rotatable relative to the spool 4.

Figure 5:
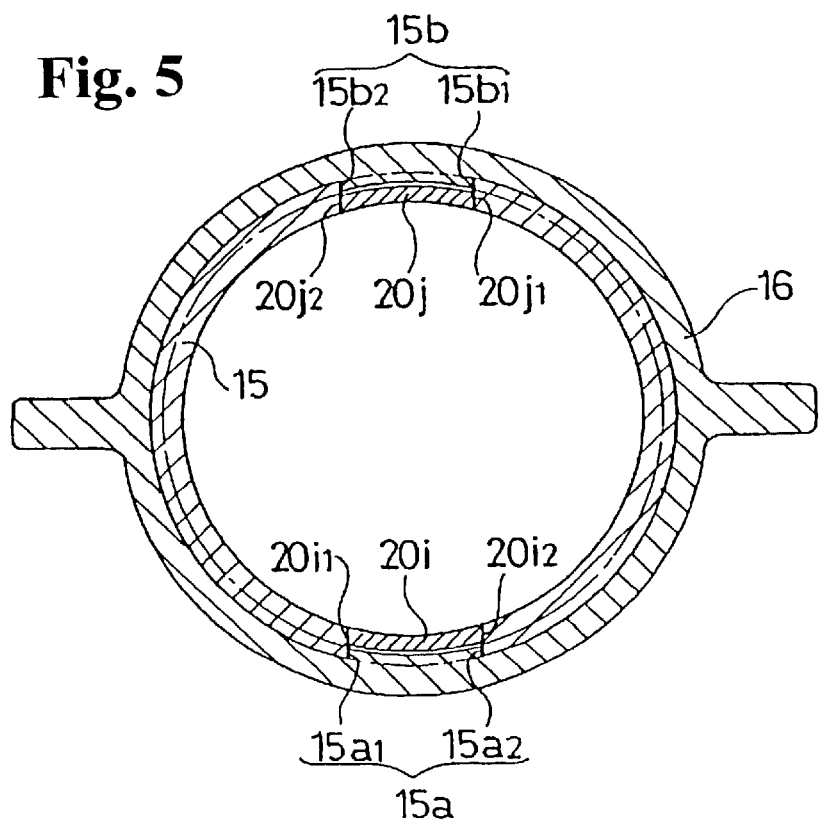
FIG. 5 is a sectional view showing a state in which the torsion pipe and the locking base, used in the embodiment, are engaged.

As shown in FIGS. 5 and 6(a), in the condition that the engaging protrusions 20i and 20j are inserted in the engaging recesses 15a and 15b, respectively, the engaging protrusions 20i and 20j can overlap the externally threaded shaft 15 in the axial direction by a predetermined amount, can move relative to the externally threaded shaft 15 in the axial direction, and can engage in the rotational direction. In this way, when the engaging protrusions 20i and 20j of the torsion pipe 20 engage the externally threaded shaft 15 so that it can engage and disengage the externally threaded shaft 15 in the axial direction, the torsion pipe 20 is mounted between the spool 4 and the externally threaded shaft 15 at the locking base 14.

The torsion bar 7, the externally threaded shaft 15 at the locking base 14, the stopper member 16, and the torsion pipe 20 form the aforementioned EA mechanism in this embodiment.

A description will now be made for the operation of the seat belt retractor 1 of the embodiment.

In the condition that the webbing is not fastened, the spool 4 is always biased by a biasing force of the spiral spring 9 of the spring means 8 in the webbing winding direction through the extension shaft 7a of the torsion bar 7, the second torque transmitting portion 18, and the bush shaft 12, so that the webbing 3 is retracted on the spool 4 by the biasing force of the spring means 8.

When a withdrawal force is applied to the webbing 3 in order to, for example, fasten the webbing, the spool 4 rotates in a webbing drawing-out or withdrawing direction against the biasing force of the spring means 8, so that the webbing 3 is withdrawn. At this time, the lock means 6 does not operate, so that the pawl 13, which is supported by the locking base 14, does not engage an internal tooth 19 of the frame 2, causing the locking base 14 to rotate integrally with the spool 4. Therefore, the torsion bar 7 and the torsion pipe 20 are not twisted and deformed, and the stopper member 16 does not rotate relative to the externally threaded shaft 15, so that it is held at the non-operating position. In addition, the pre-tensioner 11 does not operate, so that the webbing wind-up force is not applied to the spool 4 by the pre-tensioner 11.

After the webbing 3 has been extracted or withdrawn by a predetermined amount, and a tongue (not shown), which is supported by the webbing 3, has been inserted into and stopped by a buckle (not shown), a portion of the webbing 3 that has been extracted or withdrawn in excess is retracted on the spool 4 by the biasing force of the spring means 8, so that slack of the webbing 3 is removed. In this way, the webbing 3 is fitted along an occupant of a vehicle without excessively pressing down on the occupant.

In order to unfasten the webbing, when the tongue is removed from the buckle, the extracted webbing 3 is retracted on the spool 4 by the biasing force of the spring means 8, so that the webbing 3 is in the aforementioned unfastened state.

In the condition that the webbing is fastened, when a very large deceleration of a vehicle is applied as a result of, for example, a collision of the vehicle, the deceleration detecting means 5 operates at the same time that the pre-tensioner 11 operates. When the pre-tensioner 11 operates, a webbing winding force of the pre-tensioner 11 is applied to the spool 4 through the bush shaft 12, so that the webbing 3 is retracted, causing a force of constraint on the occupant caused by the webbing 3 to become large. On the other hand, when the deceleration detecting means 5 operates, the rotation of the lock ring 6a of the lock means 6 in the direction in which the webbing is extracted is prevented. However, since, due to inertia, the occupant tries to move forward because of the large vehicle deceleration, a drawing-out force is exerted on the webbing by the occupant 3. Therefore, the spool 4 starts to rotate in the direction in which the webbing is extracted, so that the withdrawal of the webbing 3 is started, and the torsion bar 7 starts to rotate in the same direction.

At the start of the rotation of the torsion bar 7, the locking base 14 also starts to rotate in the direction in which the webbing is extracted. Since the lock ring 6a is prevented from rotating, the pawl 13 rotates and engages the internal tooth 19 of the frame 2. This causes the rotation of the locking base 14 in the direction in which the webbing is extracted to be immediately locked. However, since a drawing-out or withdrawing force is further applied to the webbing 3 due the inertia of the occupant, a rotational force in the direction of withdrawing the webbing is further applied to the spool 4. As shown in FIG. 6(b), this causes the rotational force of the spool 4 to be transmitted to the second torque transmitting portion 18 of the torsion bar 7, and the rotation of the first torque transmitting portion 17 of the torsion bar 7 to be locked as a result of locking of the rotation of the locking base 14. Therefore, the torsion bar 7 is twisted and deformed. At the same time, the rotational force of the spool 4 is transmitted to the torque acting portion 20b of the torsion pipe 20 through the securing pins 21 and 22, and rotation of the engaging protrusions 20i and 20j of the torsion pipe 20 is also locked as a result of locking of the rotation of the locking base 14, that is, the rotation of the externally threaded shaft 15. Therefore, the torsion pipe 20 is also twisted and deformed. The twisting and deformation of the torsion bar 7 and the twisting and deformation of the torsion pipe 20 cause a large amount of impact energy to be absorbed. In addition, since the spool 4 rotates relative to the locking base 14, the stopper member 16, which rotates integrally with the spool 4, rotates relative to the externally threaded shaft 15. Therefore, the stopper member 16 moves axially towards the locking base 14, that is, towards the right in FIG. 1.

Figure 7:
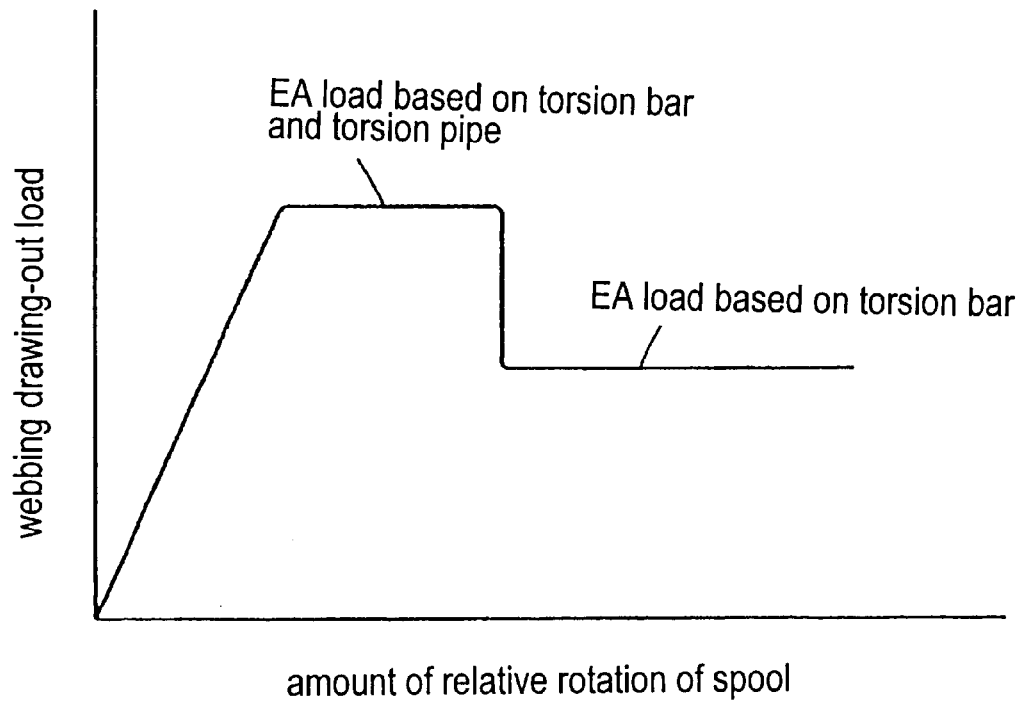
FIG. 7 illustrates EA loads of an EA mechanism used in the embodiment shown in FIG. 1.

The torsion pipe 20 is axially contracted by twisting and deformation. Since the torque acting portion 20b is axially secured to the spool 4 by the securing pins 21 and 22, the engaging protrusions 20i and 20j move, by the axial contraction, towards the left as indicated by arrows in FIG. 6(b), that is, in the axial direction such that they move out of the engaging recesses 15a and 15b, so that the amount of overlap between the engaging protrusions 20i and 20j and the corresponding engaging recesses 15a and 15b is reduced. By further twisting and deformation of the torsion pipe 20, the overlap between the engaging protrusions 20i and 20j and the corresponding engaging recesses 15a and 15b is eliminated, so that the engaging protrusions 20i and 20j move completely out of the corresponding engaging recesses 15a and 15b. When they have completely moved out, the twisting and deformation of the torsion pipe 20 is completed, so that impact energy is absorbed by twisting the torsion bar 7 alone, or by using only the torsion bar 7. As shown in FIG. 7, the EA load changes from a large EA load based on the torsion bar 7 and the torsion pipe 20 to a small EA load based on the torsion bar 7 alone.

As shown in FIG. 2, when the spool 4 rotates relative to the locking base 14 in the direction of withdrawing the webbing, the locking member 16 comes into contact with the locking base 14, and the rotation of the locking member 16 stops. Therefore, the rotation of the spool 4 stops, so that the drawing out of the webbing 3 is completed. In this way, since the impact energy is absorbed, impact on the occupant produced when a large deceleration is produced at the time of, for example, a collision of the vehicle, is reduced, so that the occupant can be reliably restrained and protected.

In the torsion pipe 20 used in the embodiment, since the engaging protrusions 20i and 20j are inserted into the corresponding engaging recesses 15a and 15b so as to be freely movable relative to each other in the axial direction, the axial length of the torsion pipe 20 and the axial length of the externally threaded shaft 15 can be arbitrarily set. Therefore, according to the torsion pipe 20 used in this embodiment, as in the cylindrical torsion bars formed at the outer side of the conventional EA mechanism including two torsion bars, the thickness, the diameter, and the material of the torsion pipe 20 are suitably selected, and the torsional performance of the torsion pipe 20 is suitably set. Also, it is possible to set not only the EA load, but also suitably set the axial length of the torsion pipe 20, the axial lengths of the engaging portions of the engaging protrusions 20i and 20j and the engaging recesses 15a and 15b during the normal time, the axial lengths of the axially extending slit holes formed in the torsion pipe 20, the widths of the slit holes, and the number of slit holes. When these settings are carried out, the torsion performance, or the EA load, of the torsion portion 20a can be arbitrarily and easily set, so that the EA load is set relatively freely.

Figure 8:
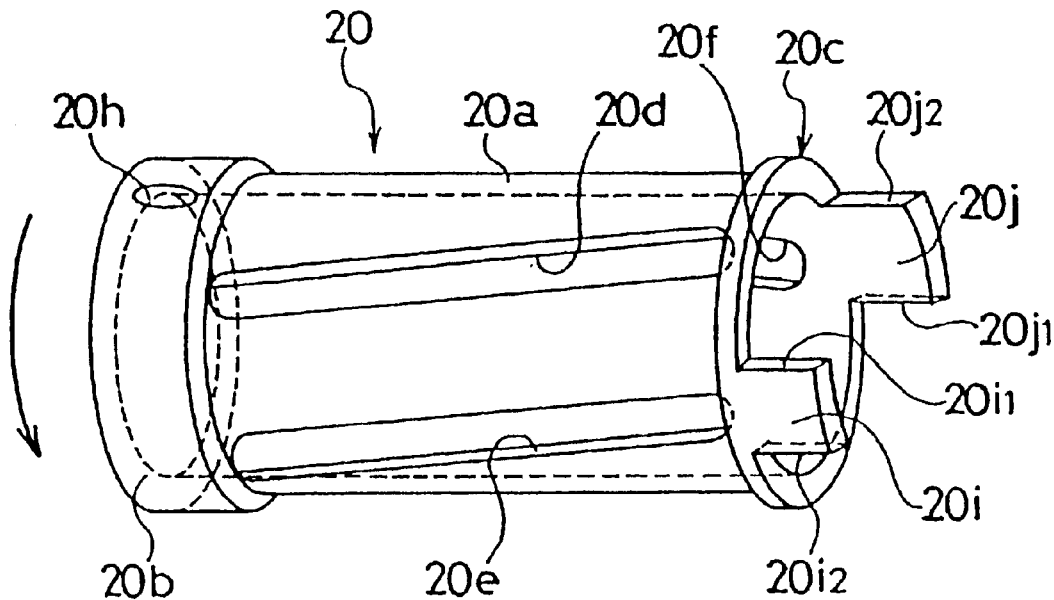
FIG. 8 is a perspective view of another embodiment of the present invention.

FIG. 8 is a perspective view of another embodiment of the present invention.

In the above-described embodiment, the slit holes 20d, 20e, and 20f of the torsion performance control portion formed in the torsion pipe 20 extend only in the axial direction. As shown in FIG. 8, in the torsional pipe 20 used in this form, slit holes 20d, 20e, and 20f are inclined by predetermined tilt angles with respect to the axial direction of the torsion pipe 20 so as to extend in the axial and peripheral directions. In this case, the slit holes 20d, 20e, and 20f are tilted with respect to the axial direction of the torsion pipe 20 so that the torque acting portion 20b side is located ahead of a side where the engaging protrusions 20i and 20j are formed in the direction of withdrawing the webbing.

By virtue of such a structure, the torsion portion 20a is twisted easily. By setting the tilting direction of the slit holes 20d, 20e, and 20f opposite to the tilting direction shown in FIG. 8, the torsion portion 20a may be made so that it is not twisted easily. In this way, by tilting the slit holes 20d, 20e, and 20f from the axial direction of the torsion pipe 20, and by properly selecting the tilting directions and the tilt angles thereof, any desired torsional performance can be obtained, so that, even in this form, the EA load can be arbitrarily set.

The other structural features, operations, and operational advantages of the seat belt retractor 1 of this form are the same as those of the seat belt retractor 1 of the above-described embodiment.

Figure 9:
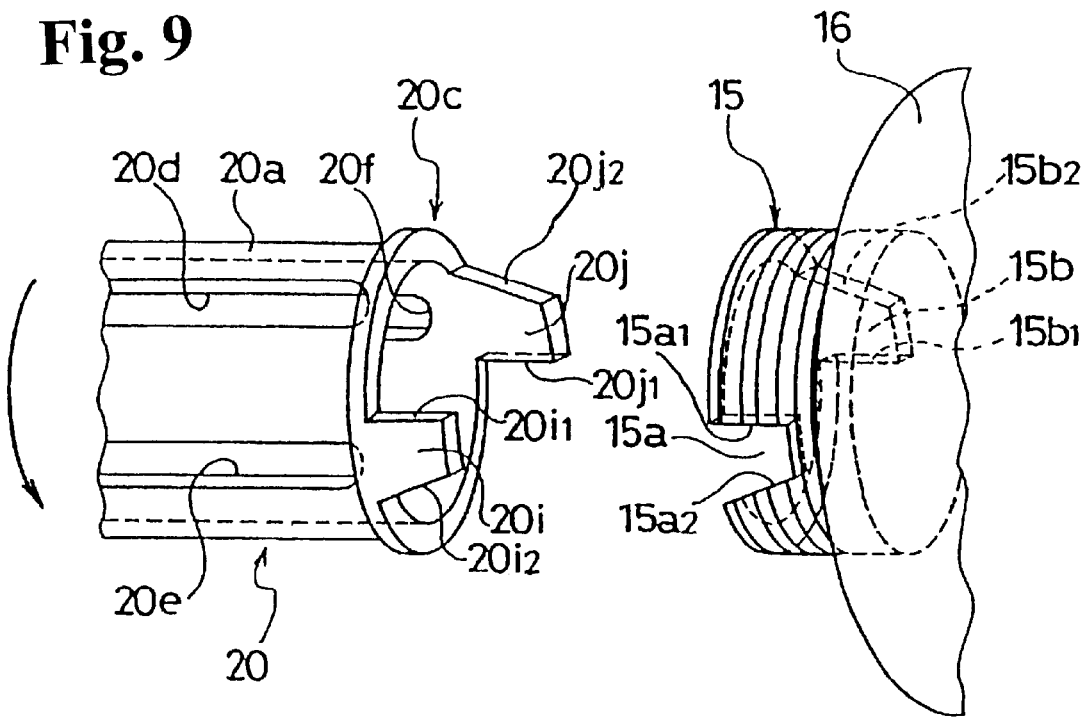
FIG. 9 is a perspective view of still another embodiment of the present invention.

FIG. 9 is a perspective view of still another embodiment of the present invention.

In the embodiment shown in FIG. 3, both side edges $20i_1$ and $20i_2$ of the engaging protrusion 20i and both side edges $20j_1$ and $20j_2$ of the engaging protrusion 20j of the torsion pipe 20, and both side edges $15a_1$ and $15a_2$ of the engaging recess 15a and both side edges $15b_1$ and $15b_2$ of the engaging recess 15b of the externally threaded shaft 15 are formed parallel to the axial direction of the torsion pipe 20 and parallel to the axial direction of the externally threaded shaft 15, respectively. In the seat belt retractor 1 of this embodiment, as shown in FIG. 9, the side edges $20i_2$ and $20j_2$ of the engaging protrusions 20i and 20j, disposed at the downstream side in the direction of withdrawing the webbing, are formed so as to be tilted by predetermined tilt angles from the axial direction of the torsion pipe 20. In this case, the side edges $20i_2$ and $20j_2$ are tilted from the axial direction of the torsion pipe 20 so that the base portion sides of the engaging protrusions 20i and 20j are located ahead of the front end portion sides thereof in the direction of withdrawing the webbing. The side edges $15a_2$ and $15b_2$ of the engaging recesses 15a and 15b, disposed at the downstream side in the direction in which the webbing is extracted, are formed so as to be tilted by tilt angles that are the same as the tilt angles of the side edges $20i_2$ and $20j_2$ of the engaging protrusions 20i and 20j from the axial direction of the externally threaded shaft 15. In this case, the side edges $15a_2$ and $15b_2$ are tilted from the axial direction of the externally threaded shaft 15 so that the front end portion sides of the engaging recesses 15a and 15b are located ahead of the bottom portion sides thereof in the direction in which the webbing is extracted.

Figure 10:
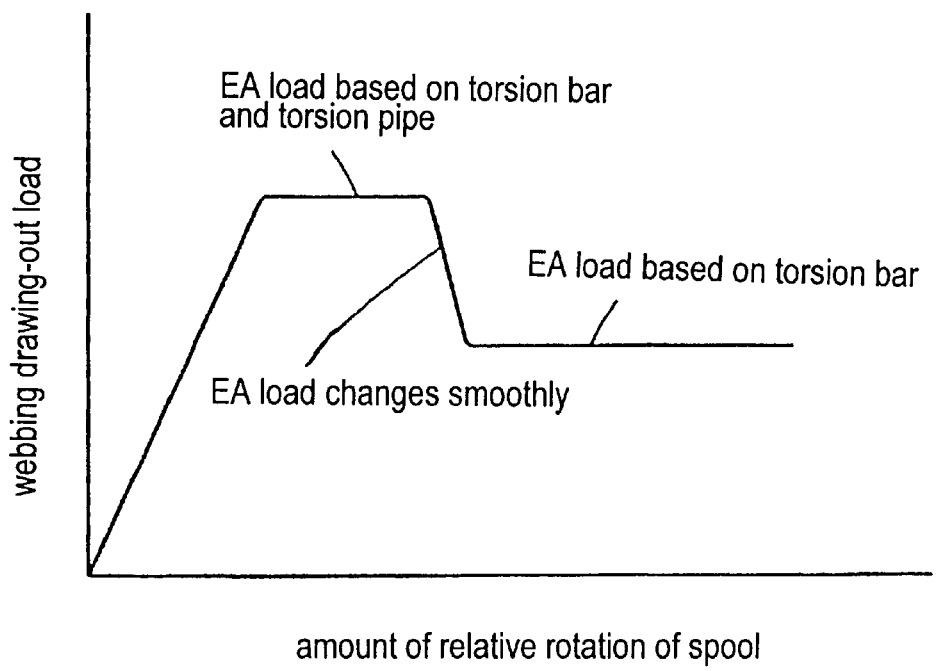
FIG. 10 illustrates EA loads of an EA mechanism used in the form shown in FIG. 9.

By forming this structure, when the engaging protrusions 20i and 20j move in the direction in which they move out of the corresponding engaging recesses 15a and 15b as a result of twisting of the torsion portion 20a, the inclined surfaces of the side edges $20i_2$ and $20j_2$ of the corresponding engaging protrusions 20i and 20j in contact with the inclined surfaces of the side edges $15a_2$ and $15b_2$ of the engaging recesses 15a and 15b gradually rotate along the inclined surfaces of the side edges $15a_2$ and $15b_2$ and gradually move in the direction in which they move out of the corresponding engaging recesses 15a and 15b in the axial direction. By virtue of this structure, according to the seat belt retractor 1 of this embodiment, as shown in FIG. 10, the EA load can be changed smoothly when the EA load changes from that based on the torsion bar 7 and the torsion pipe 20 to that based on the torsion bar 7 alone.

The other structural features, operations, and operational advantages are the same as those of the seat belt retractor 1 shown in FIG. 1.

Figure 11A:
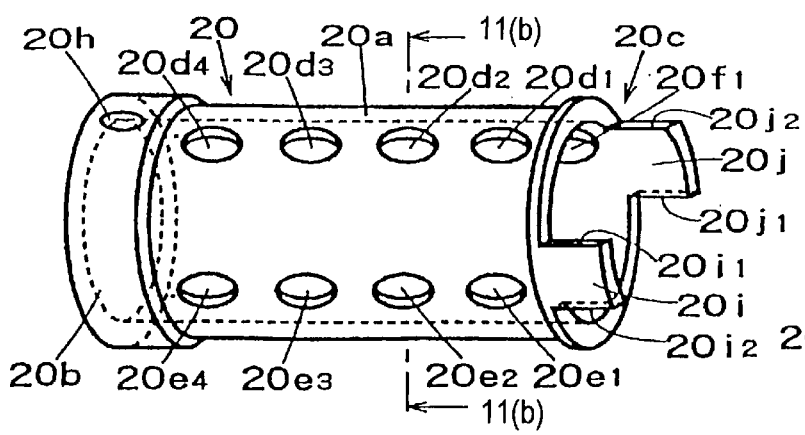
Figure 11B:
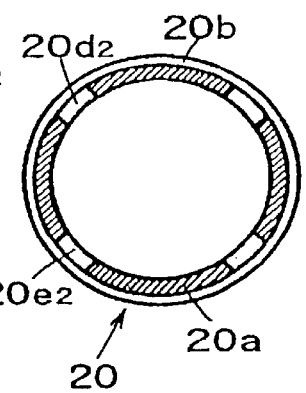

FIGS. 11(a) and 11(b) illustrate still another embodiment of the present invention, wherein FIG. 11(a) is a perspective view thereof, and FIG. 11(b) is a sectional view taken along line 11(b)–11(b) of FIG. 11(a).

In the torsion performance control portion shown in FIG. 3, the axially continuous slit holes 20d, 20e, and 20f are formed in the torsion pipe 20. In the torsion performance control portion used in this form, instead of the slit holes, as shown in FIGS. 11(a) and 11(b), four sets of a predetermined number (four in each set) of circular holes $20d_1, 20d_2, 20d_3$ and $20d_4$, and $20e_1, 20e_2, 20e_3$ and $20e_4$, and $20f_1$, etc., which are axially arranged and formed in a torsion portion 20a of the torsion pipe 20, are provided at predetermined intervals in the peripheral direction. Therefore, the circular holes of each set are continuously formed in the axial direction. The number of circular holes in one set is not limited to four, so that any number of circular holes equal to or greater than one circular hole may be provided. In addition, number of sets of the circular holes is not limited to four, so that any number of sets of the circular holes equal to or greater than one set may be provided. Further, the arrangement of one set of the circular holes is not limited to the arrangement in the axial direction, so that, as shown in FIG. 8, the set of the circular holes may be inclined with respect to the axial direction for the arrangement. Still further, the holes are not limited to the circular holes, so that elliptical holes, oval holes, rectangular holes, or holes having any other forms which can be formed in the torsion portion 20a may be used.

Figure 12:
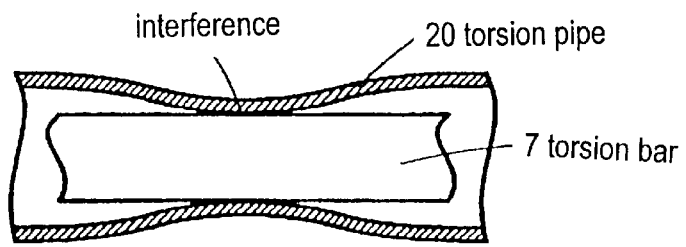
FIG. 12 illustrates interference between the torsion pipe and the torsion bar.

By virtue of this structure, each of the circular holes is formed so as to be separated from each other. Therefore, when the torsion portion 20a is twisted and deformed, inward collapsing of the torsion portion 20a is restricted. This makes it possible to prevent the inner peripheral surface of the torsion portion 20a from interfering with the torsion bar 7, as shown in FIG. 12.

The other structural features, operations, and operational advantages of this form of the seat belt retractor 1 are the same as those of the seat belt retractor 1 shown in FIG. 1.

Figure 13A:
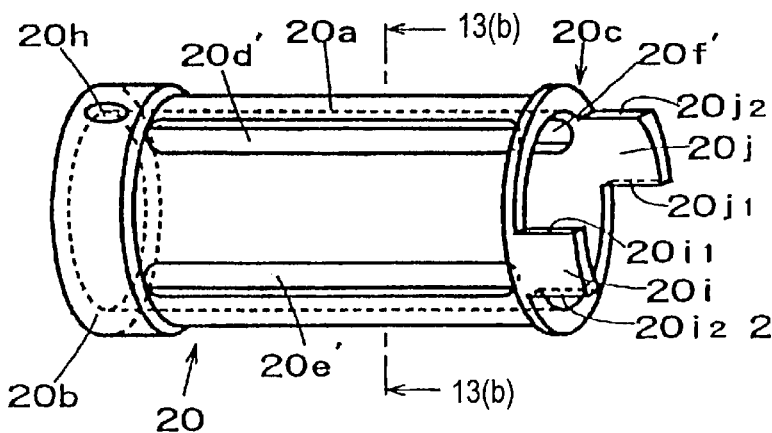
Figure 13B:
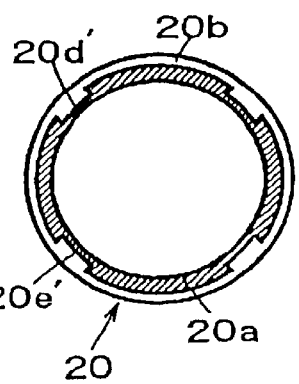

FIGS. 13(a) and 13(b) illustrate still another embodiment of the present invention, wherein FIG. 13(a) is a perspective view, and FIG. 13(b) is a sectional view taken along line 13(b)–13(b) of FIG. 13(a).

In all of the above-described embodiments, the holes formed in the torsion portion 20a of the torsion pipe 20 pass through the torsion portion 20a from the outer peripheral surface to the inner peripheral surface thereof. In this embodiment, holes which pass completely through the inner peripheral surface of the torsion portion 20a are not formed. Instead, recesses which do not pass completely through the inner peripheral surface thereof are formed. More specifically, as shown in FIGS. 13(a) and 13(b), long recesses 20d', 20e', and 20f', which extend continuously only in the axial direction, are formed in the torsion portion 20a. Although the forms of the recesses 20d', 20e', and 20f' viewed from a radial direction are the same as the forms of the slits shown in FIG. 3, these recesses 20d', 20e', and 20f' do not pass completely through the inner peripheral surface of the torsion portion 20a, as shown in FIG. 13(b). Each of these recesses 20d', 20e', and 20f' can be continuously formed in the axial direction as in the form shown in FIGS. 13(a) and 13(b). As regards the forms of the recesses viewed from a radial direction, circular holes, elliptical holes, oval holes, rectangular holes, or holes having any other forms which can be formed in the torsion portion 20a may be used.

By forming this structure, the portions of the torsion portion 20a where the recesses 20d', 20e', and 20f' are formed are also continuous in the axial direction. Therefore, as in the embodiment shown in FIGS. 11(a) and 11(b), inward collapsing of the torsion portion 20a is restricted when the torsion portion 20a is twisted and deformed. Therefore, it is possible to prevent the inner peripheral surface of the torsion portion 20a from interfering with the torsion bar 7, as shown in FIG. 12.

The other structural features, operations, and operational advantages of the seat belt retractor 1 of this embodiment are the same as those of the seat belt retractor 1 shown in FIG. 1.

Figure 14A:
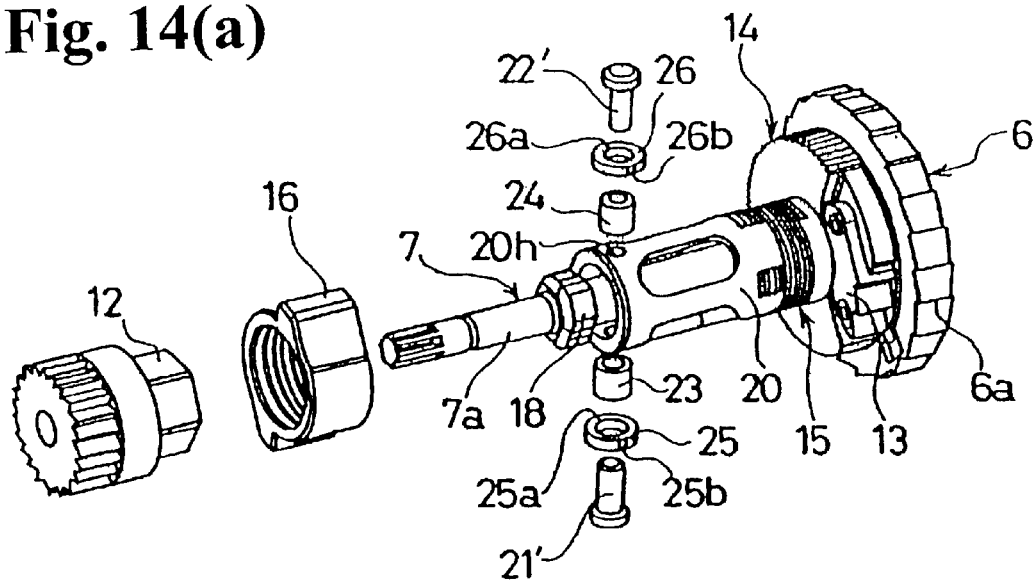
Figure 14B:
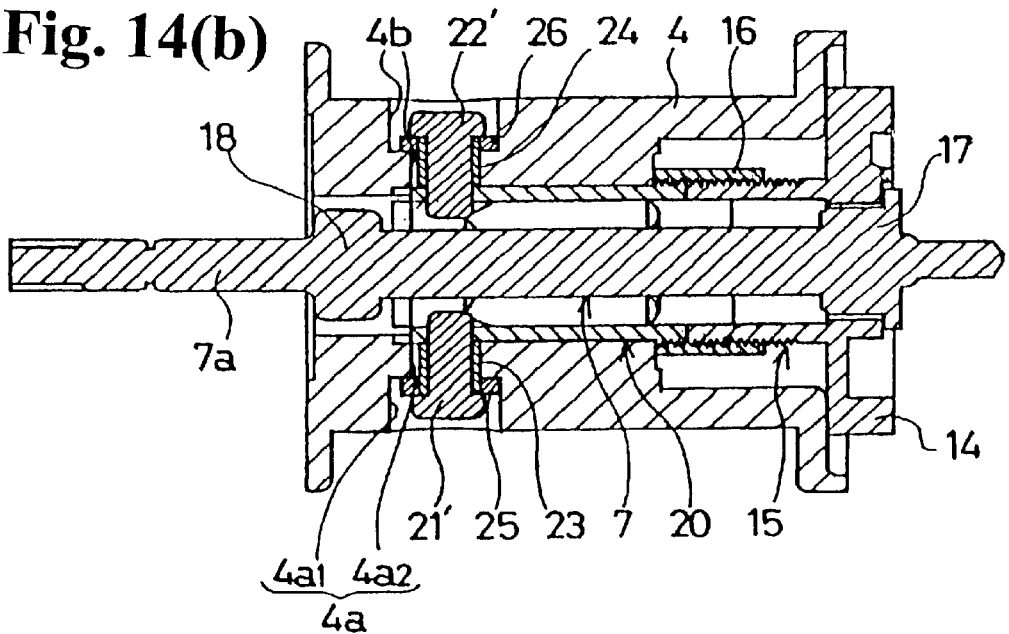

FIGS. 14(a) and 14(b) partly show still another embodiment of the present invention, wherein FIG. 14(a) is an exploded perspective view, and FIG. 14(b) is a partial sectional view taken along the same cross section as in FIG. 1.

In the above-described embodiments, one end portion side of the torsion pipe 20 is secured to the spool 4 by inserting the pair of securing pins 21 and 22 into the pair of radial pin insertion holes 4a and 4b formed in the spool 4, and the pair of radial circular pin insertion holes 20g and 20h formed in the torsion pipe 20. In the seat belt retractor 1 of this embodiment, as shown in FIGS. 14(a) and 14(b), a pair of collars 23 and 24 is inserted into the pin insertion holes 4a and 4b of the spool 4, and a pair of securing screws 21' and 22' passes through the pair of collars 23 and 24 and is screwed to the pin insertion holes 20g and 20h of the torsion pipe 20, thereby securing the pair of collars 23 and 24 to the torsion pipe 20.

Figure 15A:
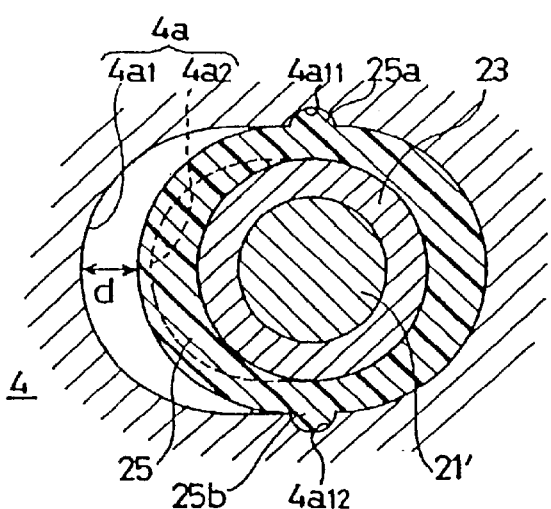
FIG. 15(a) illustrates a non-operating state of a stopper used in the embodiment shown in FIGS. 14(a) and 14(b) during a normal time.
Figure 15B:
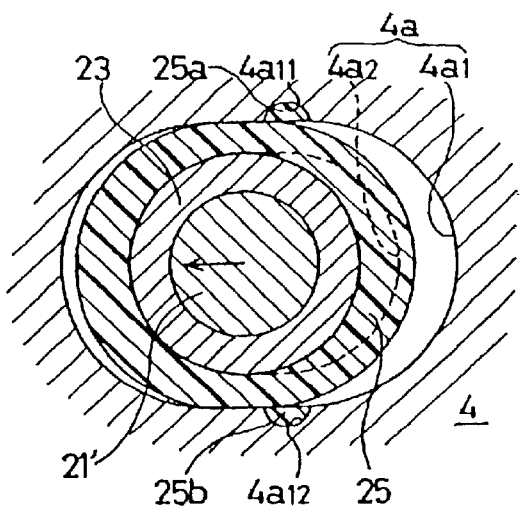
FIG. 15(b) shows an operating state of the stopper.

More specifically, as shown in FIGS. 15(a) and 15(b), the pin insertion hole 4a, formed in the spool 4, is a stepped hole formed by a first insertion hole $4a_1$ formed at the outer peripheral side of the spool 4, and a second insertion hole $4a_2$, which is smaller than the first insertion hole $4a_1$ and is disposed at the rotational center side of the spool 4. The first and second insertion holes $4a_1$ and $4a_2$ are both elongated circular shape in cross section. In this case, they are concentrically formed and are disposed so that the long and short axes thereof are aligned on the same line.

A pair of recesses $4a_{11}$ and $4a_{12}$ is formed in a pair of straight-line portions of the peripheral wall of the first insertion hole $4a_1$ so as to extend in the radial directions of the spool 4 at location situated near the locking base 14 by a predetermined distance from the center of the first insertion hole $4a_1$.

The collar 23 is formed with a cylindrical shape, and passes through the pin insertion hole 4 from the first insertion hole $4a_1$ to the second insertion hole $4a_2$. In this case, the outer diameter of the collar 23 is substantially the same as the inner diameter of an arcuate portion of the second insertion hole $4a_2$.

An annular stopper 25 formed of resin is externally fitted onto a portion of the collar 23 projecting into the first insertion hole $4a_1$. The stopper 25 is positioned inside the first insertion hole $4a_1$, and contacts the stepped portions of the first and second insertion holes $4a_1$ and $4a_2$.

As shown in FIGS. 14(a) and 15(a), the outer peripheral surface of the stopper 25 has an elongated circular shape in cross section, and the inner peripheral surface of the stopper 25 has a circular shape in cross section. In this case, the outer diameter of an arcuate portion of the elongated outer peripheral surface of the stopper 25 is substantially equal to the inner diameter of an arcuate portion of the inner peripheral surface of the first insertion hole $4a_1$ of the spool 4 with the elongated circular shape. The inner diameter of the stopper 25 is substantially equal to the outer diameter of the collar 23.

A pair of protrusions 25a and 25b, which can be fitted to the pair of recesses $4a_{11}$ and $4a_{12}$ of the first insertion hole $4a_1$, is formed in straight-line portions of the outer peripheral surface of the stopper 25.

Similarly, the other pin insertion hole 4b of the spool 4 is formed identically to the pin insertion hole 4a, and has a pair of recesses that is similar to the pair of recesses $4a_{11}$ and $4a_{12}$ formed in its first insertion hole so that they are symmetrical to a rotational shaft of the spool 4. The other collar 24 is formed identically to the collar 23, and is disposed in the same way as the collar 23.

An annular stopper 26 formed of resin is formed with the same shape as the stopper 25. Similarly to the stopper 25, the stopper 26 is externally fitted to the collar 26, and is provided inside the first insertion hole of the pin insertion hole 4b. As shown in FIG. 14(a), a pair of protrusions 26a and 26b, which is similar to the pair of protrusions 25a and 25b of the stopper 25, is formed at the outer periphery of the stopper 26 so as to fit to the pair of recesses of the first insertion hole of the pin insertion hole 4b.

The protrusions 25a and 25b and the protrusions 26a and 26b are provided to be ruptured by shearing in case, as described above, when an axial force is applied to the pair of stoppers 25 and 26 through the torsion pipe 20, the pair of securing screws 21' and 22', and the pair of collars 23 and 24, the engaging protrusions 20i and 20j of the torsion pipe 20 disengage from the pair of engaging recesses 15a and 15b of the externally threaded shaft 15. When the protrusions 25a and 25b and the protrusions 26a and 26b have ruptured, as shown in FIG. 15(b), the pair of stoppers 25 and 26 move axially towards a side opposite to the locking base 14. The movement of the stoppers 25 and 26 causes the collars 23 and 24, the securing pins 21' and 22', and the torsion pipe 20 to move away from the locking base 14. Accordingly, when the engaging protrusions 20i and 20j of the torsion pipe 20 separate from the pair of engaging recesses 15a and 15b of the externally threaded shaft 15 once, they are prevented from fitting into the pair of engaging protrusions 15a and 15b and engaging again. Therefore, the EA load of the EA mechanism is stabilized.

The other structural features of the seat belt retractor 1 of this embodiment are the same as those of the above-described embodiment and the other embodiments.

In the seat belt retractor 1 of this embodiment having such a structure, as shown in FIG. 15(a), at a normal time, the pair of protrusions 25a and 25b of the stopper 25 is fitted to the pair of corresponding recesses $4a_{11}$ and $4a_{12}$ of the pin insertion hole 4a. Identically to the stopper 25, the other stopper 26 is positioned in the axial direction of the spool 4.

By positioning the pair of stoppers 25 and 26 in this way, the pair of securing screws 21' and 22' is positioned with respect to the spool 4 through the collars 23 and 24 by the stoppers 25 and 26. Accordingly, the pair of securing screws 21' and 22' is positioned at illustrated locations of the torsion pipe 20, secured to the spool 4, and is secured to the spool 4. Similarly to the embodiment, in this state, the engaging protrusions 20i and 20j of the torsion pipe 20 are axially fitted to the pair of corresponding engaging recesses 15a and 15b of the externally threaded shaft 15 in order to engage the externally threaded shaft 15 and the torsion pipe 20 to each other in the direction of rotation.

In the condition that the pair of protrusions 25a and 25b and the pair of protrusions 26a and 26b are fitted to the pair of recesses $4a_{11}$ and $4a_{12}$ of the pin insertion holes 4a and the pair of recesses of the pin insertion holes 4b (since the recesses of the pin insertion holes 4b do not have reference numerals, a reference numeral in parentheses will be used to represent all of the recesses), the outer peripheral surfaces of locking-base-side arcuate portions of the pair of stoppers 25 and 26 contact the inner peripheral surfaces of the locking-base-side arcuate portions of the first insertion holes (4a), respectively, in order to position the stoppers 25 and 26 in the axial direction of the spool 4. In this state, predetermined distances d are produced in the axial direction between the outer peripheral surfaces of arcuate portions of the stoppers 25 and 26 opposite to the locking base side and the inner peripheral surfaces of the arcuate portions of the first insertion holes (4a) at the locking base side.

In this state, by an axial force produced when the engaging protrusions 20i and 20j of the torsion pipe 20 separate from the pair of corresponding engaging recesses 15a and 15b of the externally threaded shaft 15 in case a vehicle is considerably decelerated in, for example, a collision of the vehicle as in the above-described embodiments, the protrusions 25a and 25b of the stopper 25 and the protrusions 26a and 26b of the stopper 26 are, as described above, ruptured by shearing, so that the torsion bar 20 moves away from the locking base 14, and, as shown in FIG. 15(b), the outer peripheral surfaces of the collars 23 and 24 come to contact with and stop at arcuate portions of the corresponding second insertion holes ($4a_2$) opposite to the locking base. Therefore, the engaging protrusions 20$i$ and 20$j$ of the torsion pipe 20 do not fit to the pair of engaging protrusions 15$a$ and 15$b$ of the externally threaded shaft 15 and engage in the radial direction again. Consequently, a stable EA load is obtained.

Other usable methods of positioning and securing the stoppers 25 and 26 at the non-operating position shown in FIG. 15($a$) at a normal time, and causing the engaging protrusions 20$i$ and 20$j$ to be axially movable when they separate from the engaging recesses 15$a$ and 15$b$ include a method of cutting the outer peripheral surfaces of the stoppers 25 and 26 and a method using friction between the outer peripheral surfaces of the stoppers 25 and 26 and the inner peripheral surfaces of the first insertion holes $4a_1$.

The starting time of the movement of the stoppers 25 and 26 may include any time before or after the time when the engaging protrusions 20$i$ and 20$j$ are separated from the corresponding engaging recesses 15$a$ and 15$b$ or the time when they separate from the corresponding engaging recesses 15$a$ and 15$b$.

The protrusions may be formed at the spool 4 side, and the recesses may be formed at the stopper side. It goes without saying that the protrusions that are formed at the spool 4 side 15' are formed so that they can be ruptured by an axial force applied to the torsion bar 20 when the engaging protrusions 20$i$ and 20$j$ separate from the engaging recesses 15$a$ and 15$b$.

The collars 23 and 24 do not necessarily have to be used, so that by integrally forming collars with the securing screws 21' and 22', the collars 23 and 24 may be omitted.

Figure 16E:
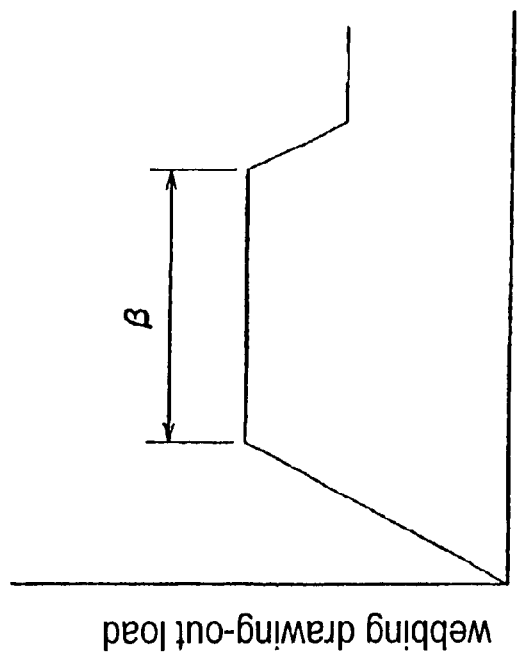
Figure 16D:
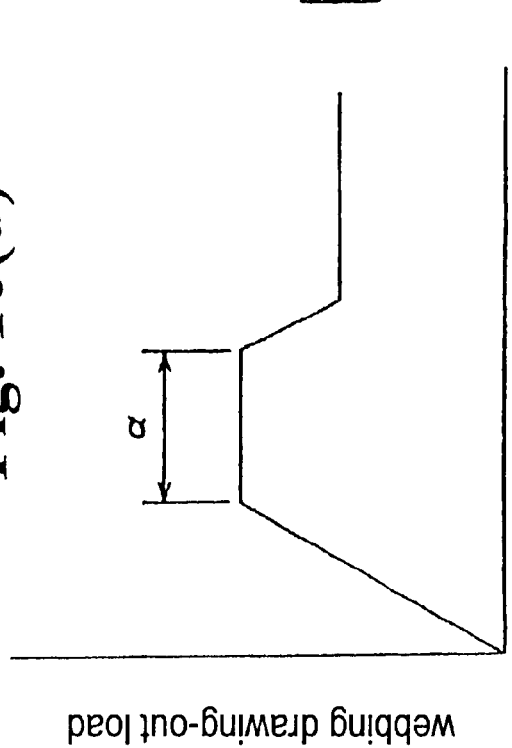

FIGS. 16($a$) to 16($e$) illustrates another embodiment of the present invention, wherein FIG. 16($a$) shows a torsion pipe in a non-operating state (assembled state), FIG. 16($b$) shows the torsion pipe during the operation thereof, and FIG. 16($c$) shows the torsion pipe after completion of the operation thereof. Structural components that correspond to those of the previous embodiments have the same reference numerals, and are not described in detail below. This is also applied to the other embodiments described below.

In the seat belt retractor 1 shown in FIGS. 1 to 7, the torsion pipe 20 is mounted without being twisted in any directions, that is, as shown in FIG. 3, the four slit holes 20$d$, 20$e$, 20$f$, etc. extend parallel to the axial direction of the torsion pipe 20. The torsion pipe 20 used in this embodiment is mounted between the spool 4 and the externally threaded shaft 15 at the locking base 14 while it is previously twisted by a predetermined amount in a minus direction, i.e. in a direction opposite to the twisting direction during the operation of the torsion pipe 20, as shown in FIG. 16($a$). Namely, it is mounted in the condition that the slit holes 20$d$, 20$e$ (other slit holes are not shown) cross in the axial direction of the torsion pipe 20 and incline in the direction opposite to the twisting direction of the torsion pipe 20.

The other structural features of this embodiment of the seat belt retractor is the same as those of the seat belt retractor 1 shown in FIGS. 1 to 7.

In the seat belt retractor 1 of this embodiment having such a structure, when an EA operation is carried out by drawing out the webbing in an emergency, the torsion pipe 20 is, from the previously twisted state in the opposite direction shown in FIG. 16($a$), twisted in the direction in which the twisting in the opposite direction is eliminated, so that the torsion pipe 20 becomes an untwisted state as shown in FIG. 16($b$), that is, in a state in which the slit holes 20$d$ and 20$e$ (other slit holes are not shown) are parallel to the axial direction of the torsion pipe 20. By further drawing out the webbing, the torsion pipe 20 is twisted, so that the torsion pipe 20 is brought into an operation completion state shown in FIG. 16($c$) as in the seat belt retractor 1 shown in FIGS. 1 to 7. In this state, the slit holes 20$d$ and 20$e$ (and other slit holes, not shown) come to a state in which they cross in the axial direction and inclines in the twisting direction of the torsion pipe 20.

When the torsion pipe 20 is mounted without being twisted in any directions as shown in FIGS. 1 to 7, as shown in FIG. 16($d$) corresponding to FIG. 7, the stroke or amount of relative rotation of the spool 4 when an EA load based on the torsion bar 7 and the torsion pipe 20 is provided becomes a predetermined amount α. When, as in this embodiment, the torsion pipe 20 is mounted while it is previously twisted in the opposite direction, as shown in FIG. 16($e$), the stroke or amount of relative rotation of the spool 4 when an EA load based on the torsion bar 7 and the torsion pipe 20 is provided becomes a predetermined amount β, which is greater than the predetermined amount α in the seat belt retractor 1 shown in FIGS. 1 to 7.

The other operations of the seat belt retractor 1 of this embodiment are the same as those of the seat belt retractor 1 shown in FIGS. 1 to 7.

In the seat belt retractor 1 of this embodiment, since the stroke of the spool 4 when an EA load based on the torsion bar 7 and the torsion pipe 20 is provided becomes large, impact energy can be effectively absorbed.

The other operational advantages of the seat belt retractor 1 of this embodiment are the same as those of the seat belt retractor 1 shown in FIGS. 1 to 7.

When the torsion pipe 20 is mounted while it is previously twisted in the opposite direction, the torsion pipes 20, such as the torsion pipes 20 shown in FIGS. 8, 9, 11, and 14, in addition to that shown in FIGS. 1 to 7, may be applied to any type of the seat belt retractor as long as the torsion pipes 20 can absorb energy as a result of being twisted and deformed.

All of the previously described torsion pipes 20 are formed so that one end, i.e. connecting side, is linked and secured to the spool 4 so that it can not move in the axial and rotational directions and the other end, i.e. engaging side, is provided so as to engage with and disengage from the externally threaded shaft 15 at the locking base 14. In contrast to this, in the present invention, the other end may be linked and secured to the locking base 14 so that it can not move in the axial and rotational directions and the one end may be engageable with and disengageable from the spool 4 in order to provide the torsion pipe. In this case, the stoppers 25 and 26, the collars 23 and 24, and the securing screws 21' and 22' are completely reversely positioned in the leftward and rightward directions in relation to those of the seat belt retractor 1 shown in FIG. 15($a$). More specifically, in FIG. 15($a$), the outer peripheral surfaces of the left arcuate portions of the stoppers 25 and 26 are positioned at locations that allow them to contact the inner peripheral surfaces of the left arcuate portions of the first insertion holes ($4a_1$), and, when the engaging protrusions 20$i$ and 20$j$ separate from the engaging recesses 15$a$ and 15$b$, these stoppers 25 and 26, etc., move toward the right.

The slit holes shown in FIGS. 1, 7, and 8, the side edge of the engaging protrusions shown in FIG. 9, the circular holes shown in FIGS. 11($a$) and 11($b$), the recesses shown in FIGS. 13($a$) and 13($b$), and the like can be suitably used in combination.

The present invention may be applied to a seat belt retractor 1 not including a lock member 16 and a pretensioner 11.

As can be understood from the foregoing description, according to the seat belt retractor of the present invention, the limit load of the webbing load limit mechanism varies in two stages from a limit load based on the twisting and deformation of both torsion bar and torsion pipe, and a limit load based on the twisting and deformation of the torsion bar alone.

In the torsion pipe used in the present invention, not only the thickness, the material, and the pipe diameter can be arbitrarily selected, but its axial length can also be set regardless of the axial length of the torsion bar. Therefore, the limit load can be set relatively freely. In addition, since the torsion pipe can be formed by using a simple pipe structure, the structure of the webbing load limit mechanism can be simplified, and the limit load is more stably set.

In particular, in the seat belt retractor according to the second aspect of the invention, the mechanism that engages with and disengages from the torsion pipe and the locking member or the spool comprises the engaging protrusion formed on the torsion pipe and the engaging recess formed in the locking member or the spool, so that the structure of the webbing load limit mechanism is further simplified.

In the seat belt retractor according to the third aspect of the invention, by the torsional performance control portion provided at the torsion pipe, the torsion pipe can have any torsional performance. Therefore, the EA load can be set more relatively freely.

In the seat belt retractor according to the fourth aspect of the invention, since the torsion performance control portion is formed by a hole or a recess, by arbitrarily setting the width of the hole or the recess, the axial length of the hole or the recess, the tilt angle of the hole or the recess with respect to the axial direction of the torsion pipe, and the number of holes or recesses, any torsional performance of the torsion pipe can be easily provided. Also, the torsion performance control portion can be easily formed by the hole or recess, and the structure of the torsion performance control portion is simplified. Moreover, since the hole or recess is easily formed, the EA load can be more stably set.

In the seat belt retractor according to the fifth aspect of the invention, since the side edge of the engaging protrusion at the downstream side in the direction in which the webbing is extracted and the side edge of the engaging recess at the downstream side in the direction in which the webbing is drawing out are inclined, the engaging protrusion gradually moves axially in the direction in which it moves out of the engaging recess while it gradually rotates in the direction in which the webbing is extracted by the inclined surfaces. This makes it possible for the limit load to vary smoothly when changing from a limit load based on the torsion bar and the torsion pipe to a limit load based on the torsion bar alone.

In the seat belt retractor according to the sixth aspect of the invention, when a vehicle is considerably decelerated in, for example, a collision of the vehicle, the torsion pipe position control means causes the torsion pipe to move so that the engageable and disengageable end side of the torsion pipe moves away from the member that engages this end side of the torsion pipe. Therefore, the engageable and disengageable end of the torsion pipe does not engage this end again, so that a stable EA load can be obtained.

In the seat belt retractor according to the seventh aspect of the invention, since a spool stroke at the time of the EA load based on the torsion bar and the torsion pipe is increased, impact energy can be more effectively absorbed.

While the invention has been explained with reference to the specific embodiments of the invention, the explanation is illustrative and the invention is limited only by the appended claims.

What is claimed is:

1. A seat belt retractor comprising:
   a spool for winding a seat belt;
   a lock mechanism cooperating with the spool and including a locking member for preventing withdrawal of the seat belt from the spool in an emergency; and
   a seat belt load limit mechanism including a torsion bar which is twistable and deformable in the emergency and is disposed in the spool for connecting the spool and the locking member, said load limit mechanism, when a rotation of the locking member in a seat belt withdrawal direction is prevented in order for the spool to rotate relative to the locking member in the seat belt withdrawal direction, limiting a load exerted on the seat belt by twisting and deformation of the torsion bar, said seat belt load limit mechanism further including a torsion pipe disposed inside an annular space between the spool and the torsion bar and having an engaging side connected to one of the spool and the locking member and a connecting side connected to the other of the spool and the locking member so that at a normal time, said engaging side of the torsion pipe engages said one of the spool and the locking member for rotation, and when the spool rotates relative to the locking member in the seat belt withdrawing direction, a load exerted on the seat belt is limited by the twisting and deformation of the torsion pipe, and the engaging side of the torsion pipe moves in a direction away from said one of the spool and the locking member by contraction of the torsion pipe in an axial direction caused by the twisting and deformation of the torsion pipe to disengage therefrom.

2. A seat belt retractor according to claim 1, wherein said torsion pipe has one end connected to the spool and the other end engageable with and disengageable from the locking member.

3. A seat belt retractor according to claim 1, wherein said torsion pipe has one end engageable with and disengageable from the spool and the other end connected to the locking member.

4. A seat belt retractor according to claim 1, wherein said engaging side of the torsion pipe includes an axially extending engaging protrusion, and the locking member or the spool includes an engaging recess for receiving the engaging protrusion so that at the normal time, the engaging protrusion is inserted into the engaging recess to engage in the direction of rotation, and when the spool rotates by a predetermined amount relative to the locking member in the seat belt withdrawing direction, the engaging protrusion moves out of the engaging recess.

5. A seat belt retractor according to claim 4, wherein a side edge of the engaging protrusion and a side edge of the engaging recess contacting each other when the spool is withdrawn are tapered in the webbing withdrawal direction.

6. A seat belt retractor according to claim 1, wherein said torsion pipe has a torsion performance control portion for controlling a torsion performance of the torsion pipe.

7. A seat belt retractor according to claim 6, wherein said torsion performance control portion includes a hole that passes completely through the torsion pipe from an outer peripheral surface to an inner peripheral surface of the torsion pipe or a recess on the torsion pipe.

8. A seat belt retractor according to claim 1, further comprising torsion pipe position control means which, when the engaging side of the torsion pipe is disengaged from the one of the spool and the locking member, moves the torsion pipe in a direction in which the engaging side of the torsion pipe moves away from the one of the spool and the locking member.

9. A seat belt retractor according to claim 1, wherein said torsion pipe is twisted in advance in a direction opposite to a direction of the twisting and deformation of the torsion pipe.

* * * * *